United States Patent [19]

Wada

[11] 4,075,539
[45] Feb. 21, 1978

[54] STEP-BY-STEP RECIPROCATING MECHANISM

[75] Inventor: Tasaku Wada, Tokyo, Japan

[73] Assignee: Kokusai Denshin Denwa Kabushiki Kaisha, Japan

[21] Appl. No.: 714,245

[22] Filed: Aug. 13, 1976

[30] Foreign Application Priority Data

Aug. 15, 1975 Japan .................................. 50-99362

[51] Int. Cl.² ........................................... H02K 41/00
[52] U.S. Cl. ...................................... 318/135; 310/12
[58] Field of Search ................... 318/135, 121, 37, 38; 310/12-14

[56] References Cited

U.S. PATENT DOCUMENTS

| 1,708,334 | 4/1929 | Spencer | 310/163 |
| 3,268,747 | 8/1966 | Snowdon | 310/13 |
| 3,867,676 | 2/1975 | Chai et al. | 318/135 |
| 3,881,139 | 4/1975 | Inaba et al. | 318/38 |
| 3,894,275 | 7/1975 | Baumans et al. | 310/12 X |

Primary Examiner—Donovan F. Duggan
Attorney, Agent, or Firm—Robert E. Burns; Emmanuel J. Lobato; Bruce L. Adams

[57] ABSTRACT

A step-by-step reciprocating mechanism for guiding a moving member along a straight guide path in the forward direction and the reverse direction. The moving member has at least one magnetic pole for each phase of a multiphase exciting current. A plurality of magnetic pole lines of a stationary member are in equal numbers at both sides of the straight guide path, and each of the magnetic pole lines has a number of fixed magnetic poles, which are successively arranged in the same pitch so as to successively oppose the magnetic poles of the moving member when the moving member travels along the straight guide path. The magnetic poles of one of the moving member and the stationary member are successively activated by the multiphase exciting current. The magnetic poles of the moving member or the stationary member are successively displaced from adjacent one of them by a pitch corresponding to one fraction of the number of phases of the multiphase exciting current.

4 Claims, 7 Drawing Figures

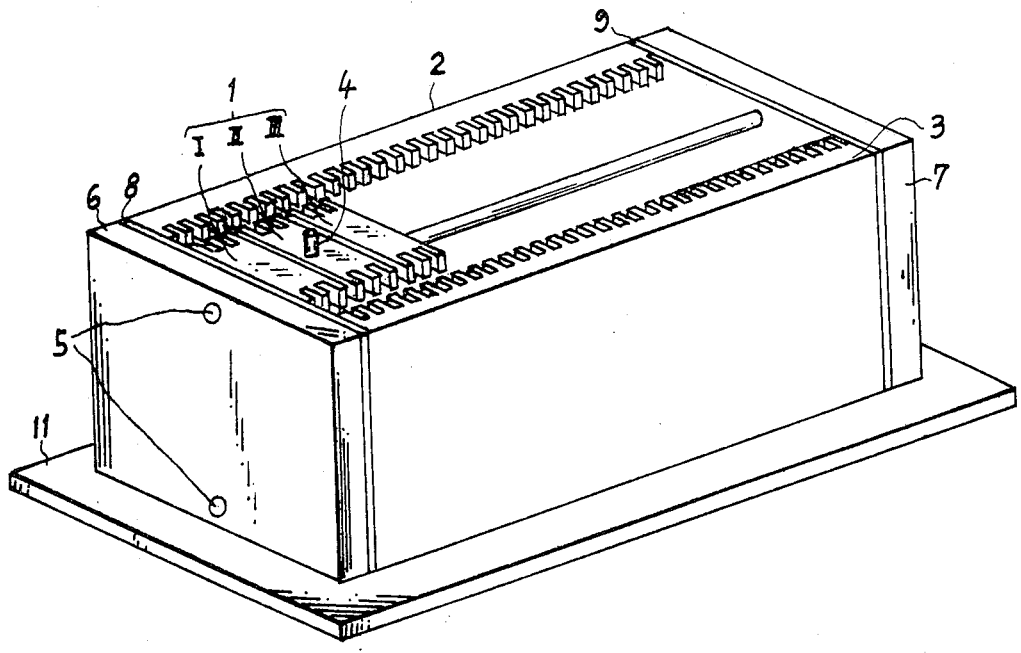
Fig. 1
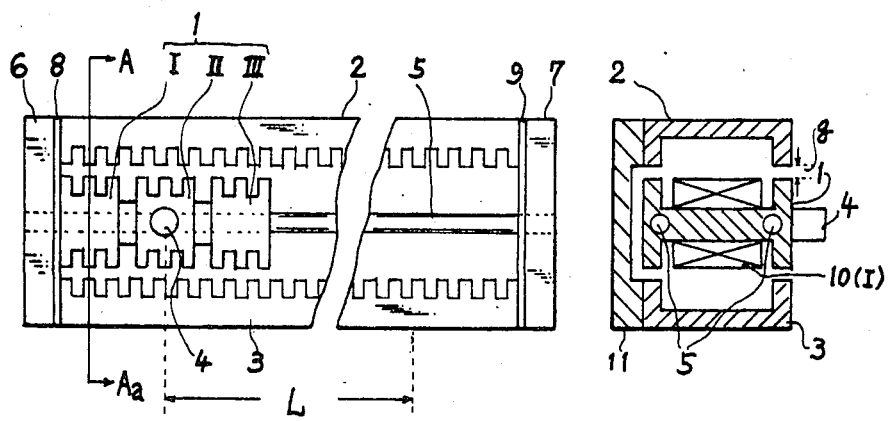 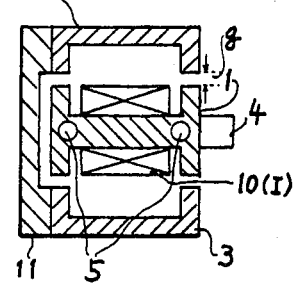
Fig. 2    Fig. 3

STEP-BY-STEP RECIPROCATING MECHANISM

FIELD OF THE INVENTION

This invention relates to a mechanism for reciprocating a moving member along a straight guide path.

BRIEF DESCRIPTION OF THE PRIOR ART

Generally, mechanical straight line motions employ mechanical elements such as gears, belts, pulleys, cams, clutches, levers, etc. for converting the rotational motion of a rotary driving member to the straight line motion. In this case, however, coupling of the respective mechanical elements introduces a great loss in power transmission, and the mechanism for converting the rotational motion to the straight line motion occupies much space.

BRIEF SUMMARY OF THE INVENTION

An object of this invention is to provide a step-by-step reciprocating mechanism, in which a straight line motion mechanism is directly used as a driving source without conversion of the rotational motion to the straight line motion, thereby to make efficient use of power and to enable miniaturization of a load device and reduction of the cost of the mechanism.

To attain the above object and other objects of this invention, a step-by-step reciprocating mechanism comprising a moving member, guide means, a stationary member, and multiphase exciting means is provided. The moving member has at least one magnetic pole for each phase of a multiphase exciting current. The guide means provided for guiding the moving member has a plurality of magnetic pole lines, which may correspond to the number of phases of the multiphase exciting current. The magnetic poles are disposed at the same pitch in such a manner as to be opposite to the magnetic poles of the moving member when the moving member is moved step by step. The multiphase exciting means is provided for sequentially exciting the magnetic poles of the moving member or the stationary members by the multiphase exciting current. Moreover, the magnetic poles of the moving member or the stationary member are successively displaced from adjacent ones of them by a pitch corresponding to one fraction of the number of phases of the multiphase exciting current.

BRIEF DESCRIPTION OF THE DRAWINGS

The principle, construction and operation of this invention will be clearly understood from the following detailed description taken in conjunction with the accompanying drawings, in which:

FIG. 1 is a perspective view illustrating an embodiment of this invention;

FIG. 2 is a plan view illustrating an embodiment of this invention;

FIG. 3 is a cross-section along a line A—Aa in FIG. 2;

DETAILED DESCRIPTION OF THE INVENTION

Figure 4:
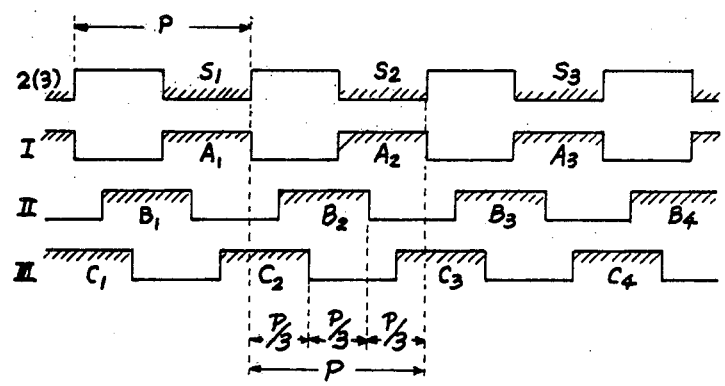
FIG. 4 show time charts explanatory of the operation of the embodiment shown in FIG. 2.

With reference to FIG. 1, an example of the construction of the step-by-step reciprocating mechanism of this invention will be described. A moving member 1 smoothly moves on guide rods 5. Magnetic poles are provided on both side ends of the moving member 1 along a direction perpendicular to its travelling direction to develop two or four magnetic pole lines at both sides of the guide rods, and poles of stationary members 2 and 3 are provided at positions opposite to the above magnetic poles. Stationary member 2 and 3 comprise stationary magnetic pole means. The moving member 1 is composed of three elements (I, II and III). The guide rods 5 are fixed at both ends to side panels 6 and 7, respectively. The side panels 6 and 7 are secured on a bottom panel 11. The moving member 1 has a load connector 4 for connecting to a load. Moreover, buffer plates 8 and 9 are each mounted on the inside surface of each side panel for relieving a shock caused by the moving member 1 when it is brought to the leftmost or rightmost end of the guide path to make contact with the inside surface of each side panel.

With reference to FIGS. 2 and 3, another embodiment of the step-by-step reciprocating mechanism of this invention in case of three-phase step control will be described. The moving member 1 composed of three elements (I, II and III) is adapted to move on the guide rods 5 in their lengthwise direction. In this embodiment magnetic poles of stationary members 2 and 3 develop four lines of magnetic poles or magnetic pole lines which are provided in equal numbers at both sides of the guide rods 5. In other words, two magnetic pole lines are developed at each side of the guide rods. The movement range L of the moving member 1 is determined by the position of the load connector 4 when the moving member 1 is contacted with the left- or right-hand side panel. Each element of the moving member 1 is provided with a coil 10 as shown in FIG. 3. When a voltage is applied to the coil 10, the moving member 1 is moved. This will hereinbelow be described with further reference to FIG. 4.

Each of the stationary members 2 and 3 has one recess and one projection (a pole) in one pitch P, and such recesses and projections are provided at the same pitch P along the entire active length of each stationary member. Each of the three elements of the moving member 1 has also recesses and projections at the same pitch P as mentioned above. In FIG. 2, the elements I, II and III are shown to be disposed side by side but, in FIG. 4, they are shown to be disposed one on another for convenience of explanation. This is because the pitch P of the stationary members 2 and 3 remains unchanged at any positions. Let it be assumed that poles $A_1$, $A_2$ and $A_3$ of the element I of the moving member 1 are, at a standstill, opposing to projections (poles) $S_1$, $S_2$ and $S_3$ of the stationary members 2 and 3. That is, a voltage is applied to the coil 10(I) so that the poles $S_1$ and $A_1$ are attracting each other. At this time, poles $B_1$, $B_2$ and $B_3$ of the element II lie at positions which displaces by P/3 from the poles $A_1$, $A_2$ and $A_3$ of the element I, respectively, and poles $C_1$, $C_2$ and $C_3$ of the element III lie at positions displacing by P/3 from the poles $B_1$, $B_2$ and $B_3$ of the element II, respectively. In FIG. 2, such displacement of the elements II and III are not precisely shown, but the following description will be given on the assumption of such displacements. Accordingly, when voltages are successively applied by ordinary switching means to the coils 10 (I), 10(II) and 10(III) of the three elements I, II and III of the moving member 1, the poles $A_2$, $B_2$ and $C_2$ of the elements I, II and III of the moving member 1 are sequentially brought into the opposing relation to the poles $S_2$ of the stationary members 2 and 3. Thus, the moving member 1 is moved to the right direction. The coils together multiphase exciting means.

On the contrary, by applying voltages to the coils 10(I), 10(II) and 10(III) of the elements, I, II and III of the moving member 1 in the reverse order, the moving member is moved to the left direction.

Figure 5:
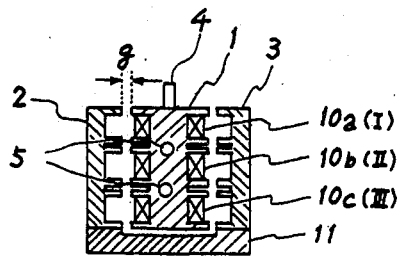
FIG. 5 is a cross-section illustrating another embodiment of this invention.

With reference to FIG. 5, further embodiment of this invention will be described. In FIG. 2, the elements I, II and III of the moving member 1 are shown to be disposed side by side but, in FIG. 5, the elements I, II and III are shown to be disposed one on another. Accordingly, poles of the stationary members 2 and 3 are provided in the opposing relation to poles of elements 10a, 10b and 10c. The two moving member guide rods 5 are provided to prevent tilting of the moving member 1 to the right or left direction, so that six magnetic pole lines of the stationary members 2 and 3 are developed at each side of the guide rods 5. In this regard, the embodiment described above in connection with FIGS. 2 and 3 is also exactly identical with the present embodiment.

Figure 6:
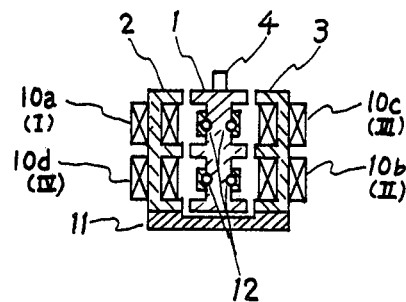
FIG. 6 is a cross-section illustrating another embodiment of this invention.
Figure 7:
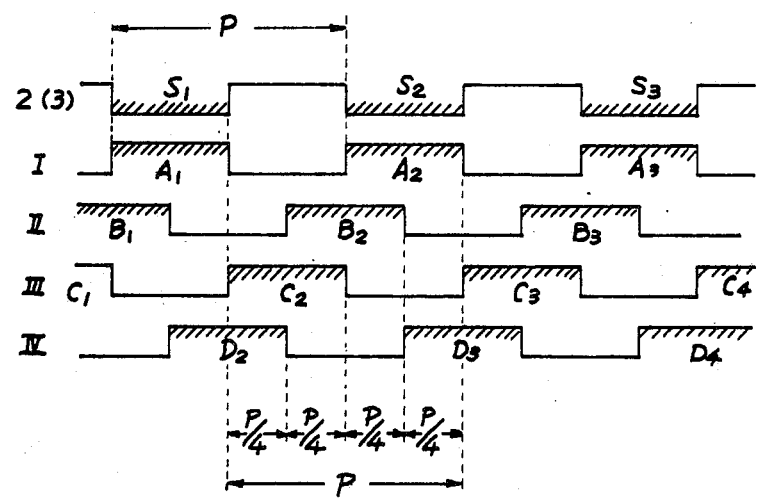
FIG. 7 shows time charts explanatory of the operation of the embodiment shown in FIG. 6.

Another embodiment of the step-by-step reciprocating mechanism of this invention is described with reference to FIGS. 6 and 7. This embodiment employs a four-phase stepping drive system. The stationary members 2 and 3 have coils 10a, 10b, 10c and 10d, and the moving member 1 is adapted to be smoothly movable on rods 12 in their lengthwise direction. Three magnetic pole lines of the stationary members 2 and 3 are developed at each side of the guide rods 12. The pitch of the poles of the stationary elements 2 (and 3) and the elements I to IV of the moving member 1 is P, and the poles of the elements are displaced by P/4 from those of adjacent ones of the elements. When voltages are successively applied to the coils I, II, III and IV in this order, the elements of the moving member 1 are respectively shifted by P/4. In other words, the poles $S_1$, $S_2$ and $S_3$ of the stationary members 2 (and 3) and the poles $A_1$, $A_2$ and $A_3$ of the element I respectively attract one another to stop the moving member 1. Thereafter, the poles $S_1$, $S_2$ and $S_3$ and the poles $B_1$, $B_2$ and $B_3$ of the element II respectively attract one another to stop the member 1. Then, the poles $C_1$, $C_2$ and $C_3$ of the element III and the poles $D_1$, $D_2$ and $D_3$ of the element IV respectively reach the positions opposing to the poles $S_1$, $S_2$ and $S_3$ of the stationary member 2. In this manner, the moving member 1 moves to the right direction.

When voltages are sequentially applied to the coils 10a to 10d of the elements I to IV in the reverse order, the moving member 1 moves to the left direction. The moving speed of the moving member 1 is determined by the speed of voltage application cycle to the coils 10a to 10d. Further, the distance of movement of the moving member 1 in one step is P/4 and hence is determined by the pitch P of the poles of the stationary member 2 (and 3) and the elements of the moving member 1.

As described in detail in the foregoing, in the present invention, a plurality of phase windings are wound on the moving member or the stationary members while voltages are successively applied to these windings one after another, so that the moving member is moved step-by-step along a straight line. Accordingly, the mechanism of this invention can be directly coupled with a load which performs a straight line motion, so that efficient driving of the load is possible. Further, since the construction of the mechanism of this invention does not include any curved surfaces, the mechanism can be constructed with high accuracy and assembled with ease. Moreover, the mechanism of this invention can be mass-produced, and hence can be provided at a low cost. Consequently, the step-by-step reciprocating mechanism of this invention can be widely used in data transmission terminal equipments such as a facsimile device, a printer, a magnetic tape recorder, etc. and is of great utility in practical use.

What I claim is:

1. A step-by-step reciprocating mechanism comprising:
    a movable member having a plurality of magnetic pole sets each for a respective phase of a multiphase exciting current and disposed one above another;
    guide means coupled to said movable member for guiding the movable member to travel along a straight guide path in a forward direction and in a reverse direction;
    stationary magnetic pole means magnetically coupled to said movable member for developing an equal number of lines of magnetic poles disposed one above another at both sides of the straight guide path, each of said lines of magnetic poles having a number of fixed magnetic poles which are successively arranged with the same pitch so as to successively oppose the poles of the movable member when the movable member travels along the straight guide path, said magnetic poles of one magnetic pole set of said movable member and a respective line of magnetic poles of said stationary means being successively displaced by a fraction of the pitch equal to the fraction of the number of phases of the multiphase exciting current one phase corresponds; and
    multiphase exciting means coupled to said moving member and said stationary means for successively magnetizing respective magnetic poles sets of said movable member and respective lines of poles of said stationary means in response to the multiphase exciting current.

2. A step-by-step reciprocating mechanism according to claim 1, in which the number of said lines of magnetic poles is two, and are respectively disposed at opposite sides of the straight guide path.

3. A step-by-step reciprocating mechanism according to claim 1, in which the number of said lines of magnetic poles at each side of said straight guide path is equal to the number of phases of said multiphase exciting current.

4. A step-by-step reciprocating mechanism according to claim 1, in which said lines of magnetic poles are disposed one above another along a direction perpendicular to the straight guide path.

* * * * *